United States Patent Office 3,526,747
Patented Sept. 1, 1970

3,526,747
ARC WELDING PROCESS AND DEVICE
Horst Keller and Ernst Witting, Frankfurt am Main, Germany, assignors to Messer Griesheim G.m.b.H., Frankfurt am Main, Germany
Filed Oct. 25, 1966, Ser. No. 589,416
Claims priority, application Germany, Oct. 28, 1965, M 67,078
Int. Cl. B23k 9/10
U.S. Cl. 219—131        6 Claims

ABSTRACT OF THE DISCLOSURE

A process and device for the AC arc welding of light metals with a torch having a non-melting electrode and utilizing a protective gas includes the regulating of the energy supply of the torch circuit in accordance with the direction of the current by means of a diode controlled in the synchronism of the welding current.

This invention relates to a process and a device for AC arc welding of light metal according to the so-called WIG process where work is performed with a torch having a non-melting electrode and using protective gas.

It is known to use alternating current for welding of light metals, with the sintering of the base metal to be welded resulting during that half cycle of the alternating current in which the electrode is negatively poled. During the other half cycle with a positively poled electrode, however, the oxide layer is pulled apart by the emission of the charge carrier of the base metal, which is always present and has a higher melting point than the base metal with respect to light metals, and is pushed to the edge of the welding bath. This purification effect of the electric arc is highly advantageous.

Because of the variety of operating temperatures and other properties of the material with respect to the non-melting electrode and the base metal to be welded, a dissimilar emissivity of electrode and melting bath results with the effect that, with respect to AC welding, the positive part of the alternating current is smaller than the negative part. This side effect is known as a "partial rectification." The current curve can be divided into a symmetrical AC curve which is superimposed by a DC envelope whose size depends on various factors, such as the properties of the welding machine and of the materials used. The disadvantage of these superimposed negative DC component lies in the fact that by the slightest positive portion of the current, the indispensable purifying effect on the welding bath surface in light metal welding is decreased in a usually undesired manner during the increased melting action.

Attempts have been made to prevent this negative DC portion or at least to lessen it. One such attempt consists in placing, in the welding circuit, a storage battery in series with the welding station and thus forcing a DC part inverse to the undesired DC component to the alternating current, supplied by the welding transformer, so that the partial rectification taking place in the electric arc is decreased or eliminated in its effects. This solution is impractical, however, since a storage battery undesirably increases the weight of a welding machine and furthermore requires continuous waiting.

Another attempt for the removal of the partial rectification in the arc consists in luring away the undesired DC components by means of a series capacitor connected in the welding circuit. However, in high amperages of the welding current, for example of 200–500 amps, capacitors are required in the size of 30,000–70,000 F. Capacitances of these sizes, however, can be produced only in relatively expensive electrolytic capacitors having practicably usable measurements. Such electrolytic capacitors have the disadvantage, however, of only a limited life span. Furthermore, in the use of capacitors, there is danger that under certain circumstances (e.g. when the electrical resistance of the current source corresponds approximately to the resistance of the capacitor) resonance currents can set in which can lead to damage or even destruction of the welding equipment.

It is the object of this invention to provide a process and a device for the AC arc welding of light metal which avoid the above-mentioned disadvantages and, in contrast to known processes and devices, makes possible an adjustment in strength of the effect of the partial rectification in adjustment to work piece strength and material. Thus, in certain instances it can be entirely advantageous if a negative DC component of certain strength remains, in order to achieve a more intense heating of the work piece and accordingly a deeper penetration with simultaneous higher capacitance of the tungsten electrode and to work while maintaining a sufficient enough purification effect of the welding bath surface. On the other hand, in welding with very low amperages, it can even be desired to impress a positive DC component to the alternating current to achieve, in the welding of thin-walled work pieces, for example, an increased purification effect of the welding bath surface. With respect, however, to storage batteries and capacitors, such adjustability of the equipment is commercially difficult to attain.

The problem set forth above is solved according to the invention in that the supply of energy to the electric arc is regulated, with a dependence on the direction of current, by means of a diode controlled in the synchronism of the welding current. In this connection, the negatively directed half cycles of the welding current are shortened by a known phase channel control of the controllable diode, or the positively directed half cycles of the welding current can be increased by means of a supplementary voltage whose connection is effected by a control of the controllable diode with a dependence on current direction.

It is noted that the prior art has attempted to counteract the partial rectification in the electric arc by means of a switch which consists of a resistor with a parallel connected and uncontrolled barrier-film rectifier. In this prior art device the resistor is passed through by about one-half welding current and the resistor must therefore be constructed of a size about 0.1 ohm for a capacitance with about 2,000 watts, which makes the installation of this resistance as the rheostat almost impossible. In the use of a solid resistor, there is the disadvantage that with increasing current intensity, the negative DC component becomes relatively smaller and with low current intensity increases accordingly. The opposite effect is desired, however. With small currents the purification effect of the welding bath surface must become greater.

The present invention enables a wide-range variation of the DC components of the welding stream, which embrace the positive and negative values.

An advantageous device for the carrying out of the process of this invention employs a control diode which is connected into the welding current. The control input of the diode is connected with conventional phase channel control step in synchronism of the welding current, and has parallel connected thereto a current path for the positively directed half cycle of the welding current with an ohmic resistance. Another advantageous device uses a welding transformer with an auxiliary winding and/or several winding taps or a special regulating transformer for the supply of the supplementary voltage. In this connection, an uncontrollable diode is connected to the controllable diode in counter-parallel connection and in series with the supplementary voltage source.

The present invention has the advantage that the relationship between the alternating current and the adjusted direct current components remains substantially constant, even when the impedance of the AC circuit is changed.

The difference between the arc voltage in the two half cycles, which inventively changes very slightly with the welding current strength and which, for example, in the use of pure aluminum as the material to be welded and tungsten as the electrode at 20 volt positive arc tension and 10 volt negative arc tension (with reference to the electrode polarity), takes on a considerable percentile value, and hence can inventively be equalized or lessened either by a decrease of the energy content of the negative half cycle or by a supplementary tension effective during the positive half cycle.

Further characteristics of the invention are given in the following description in connection with the accompanying drawings which show various examples of construction of the inventive switching device and in which.

Figure 1:
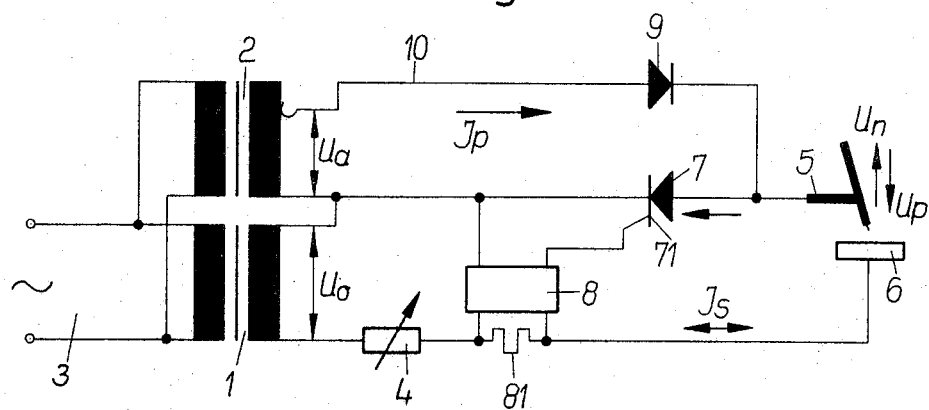
FIG. 1 shows the wiring diagram of the one embodiment of an inventively constructed AC arc welding device.

The device according to FIG. 1 has a main welding transformer 1 which supplies the fixed free-wheel tension $U_o$, and a control transformer 2 for the supply of a variable free-wheel tension $U_a$. The primary windings of both transformers are connected parallel to each other at an AC voltage source 3. For adjusting the welding current strength $I_s$, a control resistor 4 is provided. In the various figures, a torch 5 has a non-melting electrode and is disposed above the work piece 6 to be welded.

In the main circuit of the device supplied from the secondary winding the transformer 1, there is furthermore provided a control diode 7 whose control electrode 71 is connected with an impulse control device 8 whose input is parallel connected in series with the control resistor 4, to a resistor 81, and hence is activated in the synchronism of the laternating current $I_s$ over what may be considered a trigger circuit. In a parallel circuit 10 to the control diode 7 an uncontrollable, reverse-poled diode 9 is connected in series with the secondary winding of transformer 2 supplying the variable free-wheel supplementary tension $U_a$.

The control diode 7 is conductive only for the negative half cycles $I_n$ of the welding current $I_s$ and only with the abutment of a certain potential at its control electrode 71. The impulse control device 8 is impelled depending on the synchronism of the welding current $I_s$ in such a manner that the required control potential is always present during the negative half cycle when a certain arc tension is present. Accordingly the reference $I_n = (U_o - U_n)/R$ holds true for the negatively directed current $I_n$. A flowing of the current in the parallel circuit 10 is prevented by the unchangeable diode 9 reverse-poled to diode 7.

During the positive half cycle of the welding current $I_s$, the control diode 7 locks, so that in this instance a current $I_p$ flows in the direction of the arrow through diode 9 over circuit 10 to the welding station with the positive arc tension $U_p$. The supplementary tension $U_a$ is thus actuated and the equation $I_p = (U_o + U_a - U_p)/R$ holds true for the current $I_p$. If the DC components, subject to electric arc, are removed and both current $I_n$ and $I_p$ are kept at an even size, it is easy to derive from both of the above-mentioned current equations that the supplementary tension should then be $U_a = U_p - U_n$. By an increase or decrease in the tension $U_a$ as compared to this value, a negative or even positive DC component can be set up selectively and in accordance with certain welding circumstances.

Figure 2:
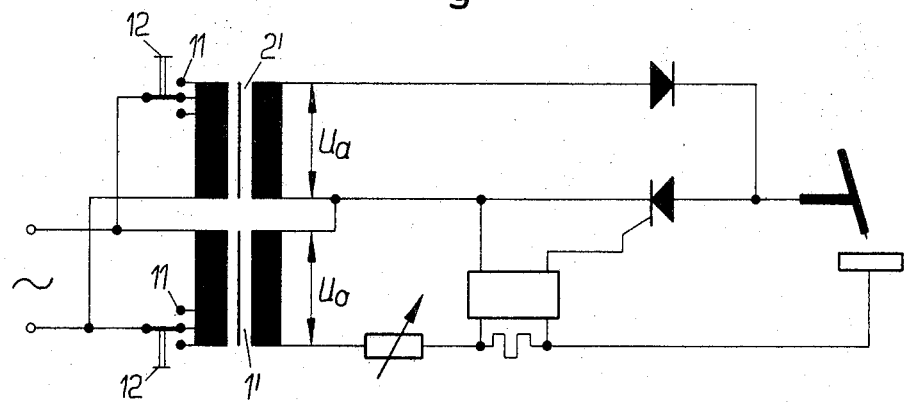
FIG. 2 shows the wiring diagram according to FIG. 1 in alternate form.

The example of construction according to FIG. 2 is similar to the embodiment of FIG. 1 with the single difference that the primary windings of transformers 1' and 2' are provided with taps 11 and selector switches 12, so that a step-wise change of the welding current tension $U_o$ and of the supplementary tension $U_a$ is possible.

Figure 3:
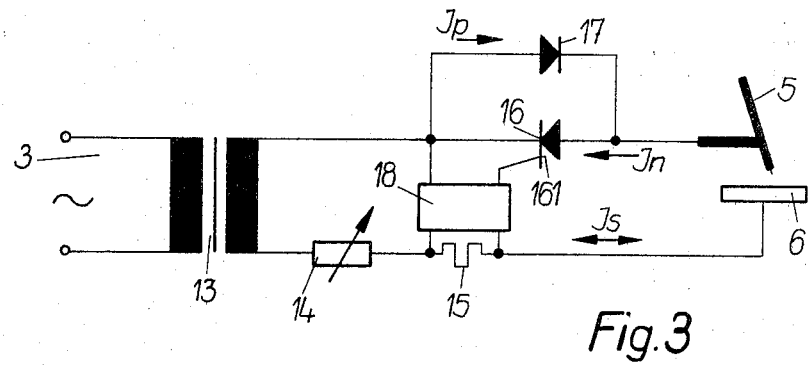
FIG. 3 shows a second embodiment of construction of device according to the invention.

In FIG. 3 a device is shown wherein no special supplementary tension is produced, but instead the negative DC component in the welding current $I_s$ is decreased or even eliminated by phase channel control of the negative half cycle of the welding current. For this purpose the device has a welding transformer 13 attached to the alternating current source 3 whose secondary winding, as in the above-described examples, is conducted across a welding current regulating resistor 14, a current tapping resistor 15, the work piece 6, the welding torch 5 and a controlled diode 16, where a reverse-poled uncontrolled diode 17 is again connected to the controlled diode 16. The control electrode 161 of the controlled diode 16 is connected with a phase channel switching step 18 which taps off its initial tension on the resistor 15.

During the positive half cycles of the welding current $I_s$, the controllable diode 16 is closed, and the current $I_p$ flows across the uncontrolled diode 17 to the welding station. During the negative half cycles of the welding current $I_s$, the uncontrolled diode 17 is closed, and the current $I_n$ must flow across the controllable diode 16. This diode 16 is controlled by means of the phase channel switching step 18 in such a manner that it is slowly opened as opposed to the initial (zero) passage of the welding current $I_s$ at the moment $t2$, so that only at moment $t3$ does a negative welding current $I_n$ take place as illustrated in the current/time diagram of FIG. 5.

Figure 4:
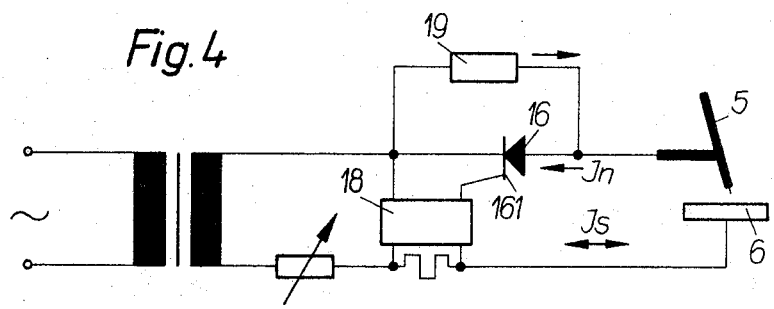
FIG. 4 shows an alternate form of the design of FIG. 3.

With such a circuit, the uncontrolled diode 17 can, as shown in FIG. 4, also be replaced by a resistor 19, placed parallel to the controlled diode 16, which has low resistance and therefore hardly hinders the positive half cycle $I_p$ of the welding circuit $I_s$, but is greater than the forward resistance of the controllable diode 16, so that with opened diode 16 no parallel current worth mentioning flows over the resistor 19.

Figure 5:
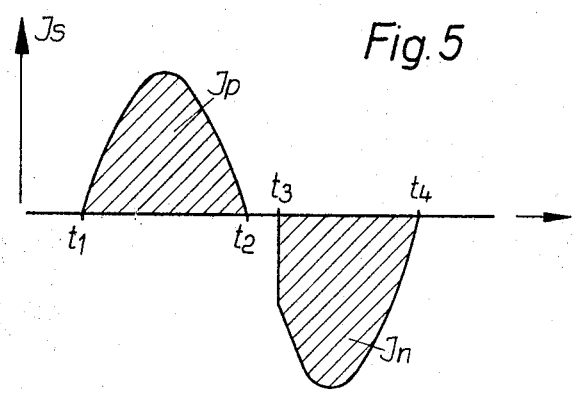
FIG. 5 shows a current curve design illutrating the manner of operation of the devices according to FIGS. 3 and 4.

The phase channel control illustrated in FIG. 5 is known. Its effect consists in that the surface covered by the negative half cycle $I_n$ (shown shaded in the drawing), despite a large amplitude of this negative half cycle, is equal to the surface covered by the positive half cycle $I_p$ (shown shaded in the drawing) i.e. the designation $$\int_{t_1}^{t_2} I_p \cdot dt = \int_{t_3}^{t_4} I_n \cdot dt$$

holds true. The desired spark lag is set up at the switching step 18. Even with this circuit the welding current ratios are widely varied.

Figure 6:
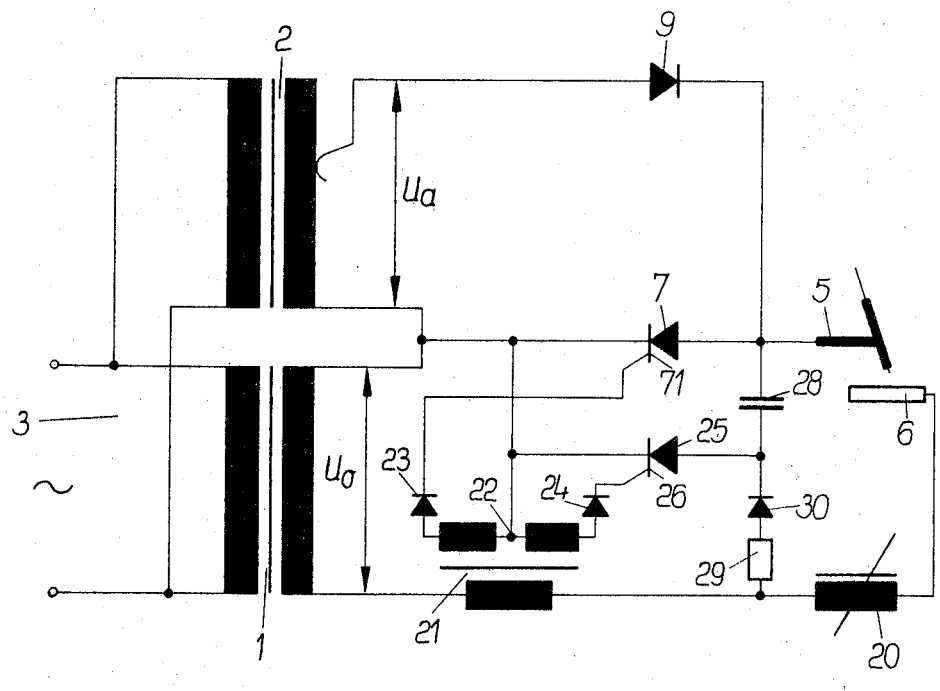
FIG. 6 shows a further embodiment of construction (similar to the embodiment of FIGS. 1 and 2) of a device according to the invention with a forced reversing step.

In the circuits according to FIGS. 1–4, for the sake of simplicity the welding current is first of all determined by an ohmic resistor 4 or 14. However, in welding devices, an inductive reactance is used for various reasons as the compensating resistor in a known manner. In this connection, the controlled diode used in the circuits must be provided with a forced reversing device. Such a device is shown in FIG. 6 which is also similar to the embodiment of FIG. 1. Accordingly the circuit parts of FIG. 6 corresponding to like parts have like reference numerals, as in FIG. 1.

For adjusting of the welding current amperage, a controllable inductive resistor 20 is provided. The forced reversing circuit has a current transformer 21 which secondarily has a center tap 22 and on the one side is connected by means of diode 23 with the control electrode 71 of the controllable diode 7 while on the other side connected by means of a diode 24 with the control electrode 26 of a controlled quenching diode 25. The diode 25 is connected on the one side with the one pole of the welding transformer 1 and on the other side with the branch point 27 between a capacitor 28 and a diode 30 switched in series with a resistor 29. Capacitor 28, resistor 29 and diode 30 are connected in series with the welding current inductance 20 and the welding station 5/6.

While the controllable diode 7 is conductive, capacitor 28 is charged by means of diode 30 and resistor 29. At the beginning of the negative half cycle of the welding current flowing across uncontrolled diode 9, controllable diode 7 is ignited by means of current transformer 21 and diode 23. When diode 9 is again conductive, quenching diode 25 is ignited by means of current transformer 21 and diode 24 and thus capacitor 28 is discharged by means of both controllable diodes 7 and 25. This closes the controllable diode 7.

The control of both diodes 7 and 25 is effected suitably by current impulses, since the diodes employed for this purpose require relatively large ignition and extinguishing currents (about 1 amp), which could lead to an extensive thermal load of the control electrodes in a continuous signal operation. The impulse control furthermore has the advantage that it allows a control accurate as to time.

The current transformer 21 employed for the forced reversing circuit can be designed in such a manner that the secondarily produced current represents a true image of the operating current. The current transformer can suitably be so designed that it reaches its saturation range on the primary side even during transmission of a slight welding current which produces secondary current impulses in the initial (zero) passage of the current which are particularly advantageous for the control of diodes 7 and 25.

Obviously many modifications and variations of the invention are possible in light of the above teachings. It is therefore to be understood that within the scope of the appended claims the invention may be practiced otherwise than specifically described.

What is claimed is:

1. A device for use in the AC arc welding of light metal work pieces, in combination therewith, a torch having a non-melting electrode and using a protective gas, an AC source, a transformer having a primary winding connected to said AC source and having a first secondary winding, a first branch including a control diode interconnecting one end of said winding to said torch, a second branch connected to the opposite end of said winding and adapted to be connected to the metal workpieces, a second secondary winding having one end connected to said opposite end of said first winding, a third branch including an uncontrolled diode interconnecting the other end of said second secondary to said torch for conducting positive half cycles of the welding current, a trigger circuit connected to said control diode and the light metal work piece for operating in synchronism with the polarity of the welding current to fire said control diode at substantially the commencement of each negative half cycle whereby said control diode remains conductive during each negative half cycle period to pass the negative half cycles to the welding arc and is non-conductive during each positive half cycle period with each positive half cycle passing through said parallel circuit to the welding arc, and the energy content of each positive half cycle being increased by a supplementary voltage produced by said second secondary winding.

2. A device as set forth in claim 1 wherein said transformer includes a plurality of winding taps for varying the magnitude of the supplementary voltage.

3. A device as set forth in claim 1 wherein said uncontrolled diode is connected in series with second secondary winding both of which are connected in parallel with said control diode.

4. A device for use in the AC arc welding of light metal work pieces, in combination therewith, a torch having a non-melting electrode and using a protective gas, an AC source, a welding transformer having a primary winding connected to said AC source and having a secondary winding connected to said torch and including a control diode in series therewith, a branch including a current limiting means connected in parallel with said control diode for conducting the positive half cycles of the welding current, a trigger circuit connected to said control diode and the light metal work piece, said trigger circuit including a phase control network for operating in synchronism with the polarity of the welding circuit with said phase control network being operable to fire said control diode at a period after the polarity of the welding current passes from a positive direction to a negative direction whereby the commencement of each successive negative half cycle is delayed thereby to decrease the energy content of each negative half cycle.

5. A device as set forth in claim 4 wherein said current limiting means is a resistor having a resistance larger than the forward resistance of said control diode but sufficiently low to cause negligible voltage drop when the positive half cycles pass therethrough.

6. A device as set forth in claim 4 wherein said parallel current limiting means is an uncontrollable diode for conducting the positively directed half cycles of said welding current.

References Cited
UNITED STATES PATENTS

| | | | |
|---|---|---|---|
| 2,697,160 | 12/1954 | Williams | 219—135 |
| 2,951,930 | 9/1960 | McKechnie. | |
| 3,202,871 | 8/1965 | Shelar | 219—131 X |
| 3,218,511 | 11/1965 | Rosenbaum | 307—252 X |
| 3,300,683 | 1/1967 | Weishaar | 219—137 |
| 3,350,538 | 10/1967 | Johnson | 219—131 |
| 3,068,352 | 12/1962 | Correy | 219—137 |
| 3,328,637 | 6/1967 | Aldenhoff | 219—131 X |

JOSEPH V. TRUHE, Primary Examiner

J. G. SMITH, Assistant Examiner